US007965186B2

(12) United States Patent
Downie et al.

(10) Patent No.: US 7,965,186 B2
(45) Date of Patent: Jun. 21, 2011

(54) PASSIVE RFID ELEMENTS HAVING VISUAL INDICATORS

(75) Inventors: John D. Downie, Painted Post, NY (US); Mark P. Taylor, Montour Falls, NY (US); James S. Sutherland, Corning, NY (US); Richard E. Wagner, Painted Post, NY (US); Matthew S. Whiting, Lawrenceville, PA (US); Leo Nederlof, Antwerp (BE)

(73) Assignee: Corning Cable Systems, LLC, Hickory, NC (US)

( * ) Notice: Subject to any disclaimer, the term of this patent is extended or adjusted under 35 U.S.C. 154(b) by 784 days.

(21) Appl. No.: 11/716,454

(22) Filed: Mar. 9, 2007

(65) Prior Publication Data

US 2008/0220721 A1 Sep. 11, 2008

(51) Int. Cl.
*G08B 13/14* (2006.01)

(52) U.S. Cl. .............. 340/572.1; 340/10.1; 340/815.45; 235/375

(58) Field of Classification Search .... 340/572.1–572.8, 340/10.1; 235/375, 385
See application file for complete search history.

(56) References Cited

U.S. PATENT DOCUMENTS

| | | | |
|---|---|---|---|
| 3,771,098 A | 11/1973 | Dempsey | |
| 3,931,574 A | 1/1976 | Curtis, Jr. et al. | |
| 3,942,859 A | 3/1976 | Korodi | |
| 4,019,128 A | 4/1977 | Chebowski | |
| 4,365,238 A | 12/1982 | Kollin | |
| 4,578,636 A | 3/1986 | Bakke et al. | |
| 4,626,633 A | 12/1986 | Ruehl et al. | |
| 4,889,977 A | 12/1989 | Haydon | 235/375 |
| 4,924,213 A | 5/1990 | Decho et al. | |
| 4,937,529 A | 6/1990 | O'Toole, III et al. | |
| 4,978,317 A | 12/1990 | Pocrass | |
| 5,081,627 A | 1/1992 | Yu | |
| 5,185,570 A | 2/1993 | Fitzpatrick | |
| 5,199,093 A | 3/1993 | Longhurst | |
| 5,222,164 A | 6/1993 | Bass, Sr. et al. | |
| 5,244,409 A | 9/1993 | Guss, III et al. | |
| 5,265,187 A | 11/1993 | Morin et al. | |
| 5,297,015 A | 3/1994 | Miyazaki et al. | |
| 5,305,405 A | 4/1994 | Emmons et al. | |
| 5,337,400 A | 8/1994 | Morin et al. | |

(Continued)

FOREIGN PATENT DOCUMENTS

DE 19841738 3/2000

(Continued)

OTHER PUBLICATIONS

Patent Cooperation Treaty, International Search Report for International Application No. PCT/US2008/003098, Jul. 17, 2008, 1 page.

*Primary Examiner* — Eric M Blount
(74) *Attorney, Agent, or Firm* — Kwadjo Adusei-Poku

(57) ABSTRACT

There are provided components, connectors, receptacles, cables, and systems wherein passive RFID functionality is incorporated. Also provided are passive RFID elements in general. The passive RFID elements power visual indicators based on receipt of external RF signals. Passive energy storage devices may be employed to provide electrical energy to the visual indicators. The passive energy storage devices may be charged by the external RF signals. The visual indicators may operate continuously or according to a predetermined flashing pattern.

90 Claims, 5 Drawing Sheets

U.S. PATENT DOCUMENTS

| | | |
|---|---|---|
| 5,353,367 A | 10/1994 | Czosnowski et al. |
| 5,418,334 A | 5/1995 | Williams |
| 5,448,675 A | 9/1995 | Leone et al. |
| 5,483,467 A | 1/1996 | Krupka et al. |
| 5,528,222 A | 6/1996 | Moskowitz et al. |
| 5,588,873 A | 12/1996 | Hamai et al. |
| 5,601,451 A | 2/1997 | Driones et al. |
| 5,613,873 A | 3/1997 | Bell, Jr. |
| 5,638,818 A | 6/1997 | Diab et al. |
| 5,645,440 A | 7/1997 | Tobler et al. |
| 5,660,567 A | 8/1997 | Nierlich et al. |
| 5,666,453 A | 9/1997 | Dannenmann |
| 5,685,737 A | 11/1997 | Morin et al. |
| 5,692,925 A | 12/1997 | Bogese, II |
| 5,700,157 A | 12/1997 | Chung |
| 5,704,802 A | 1/1998 | Loudermilk |
| 5,741,152 A | 4/1998 | Boutros |
| 5,782,757 A | 7/1998 | Diab et al. |
| 5,797,767 A | 8/1998 | Schell |
| 5,821,510 A | 10/1998 | Cohen et al. .................. 235/375 |
| 5,842,045 A | 11/1998 | Nakamura |
| 5,847,557 A | 12/1998 | Fincher et al. |
| 5,876,239 A | 3/1999 | Morin et al. |
| 5,876,240 A | 3/1999 | Derstine et al. |
| 5,885,100 A | 3/1999 | Talend et al. |
| 5,910,776 A | 6/1999 | Black ....................... 340/825.35 |
| 5,914,862 A | 6/1999 | Ferguson et al. |
| 5,915,993 A | 6/1999 | Belopolsky et al. |
| 5,924,889 A | 7/1999 | Wang |
| 5,934,925 A | 8/1999 | Tobler et al. |
| 5,984,731 A | 11/1999 | Laity |
| 5,995,006 A | 11/1999 | Walsh |
| 5,995,855 A | 11/1999 | Kiani et al. |
| 6,002,331 A * | 12/1999 | Laor ........................... 340/539.1 |
| 6,025,725 A | 2/2000 | Gershenfeld et al. |
| 6,068,627 A | 5/2000 | Orszulak et al. |
| 6,095,851 A | 8/2000 | Laity et al. |
| 6,095,869 A | 8/2000 | Wang |
| 6,100,804 A | 8/2000 | Brady et al. |
| 6,102,741 A | 8/2000 | Boutros et al. |
| 6,113,422 A | 9/2000 | Somerville et al. |
| 6,116,946 A | 9/2000 | Lewis et al. |
| 6,116,962 A | 9/2000 | Laity |
| 6,118,379 A | 9/2000 | Kodukula et al. |
| 6,120,318 A | 9/2000 | Reed et al. |
| 6,127,929 A | 10/2000 | Roz |
| 6,133,835 A | 10/2000 | De Leeuw et al. |
| 6,142,822 A | 11/2000 | Wu |
| 6,152,762 A | 11/2000 | Marshall et al. |
| 6,164,551 A | 12/2000 | Altwasser |
| 6,174,194 B1 | 1/2001 | Bleicher et al. |
| 6,217,371 B1 | 4/2001 | Wu |
| 6,224,417 B1 | 5/2001 | Belopolsky et al. |
| 6,227,911 B1 | 5/2001 | Boutros et al. |
| 6,232,870 B1 | 5/2001 | Garber et al. ................ 340/10.1 |
| 6,241,550 B1 | 6/2001 | Laity et al. |
| 6,256,523 B1 | 7/2001 | Diab et al. |
| 6,280,213 B1 | 8/2001 | Tobler et al. |
| 6,285,293 B1 | 9/2001 | German et al. |
| 6,319,051 B1 | 11/2001 | Chang et al. |
| 6,319,062 B1 | 11/2001 | Ma et al. |
| 6,325,664 B1 | 12/2001 | Someda et al. |
| 6,349,228 B1 | 2/2002 | Kiani et al. |
| 6,352,446 B2 | 3/2002 | Ezawa et al. |
| 6,354,884 B1 | 3/2002 | Yeh et al. |
| 6,375,362 B1 | 4/2002 | Heiles et al. |
| 6,402,743 B1 | 6/2002 | Orszulak et al. |
| 6,404,339 B1 | 6/2002 | Eberhardt |
| 6,409,530 B1 | 6/2002 | Zhao et al. |
| 6,424,263 B1 | 7/2002 | Lee et al. |
| 6,424,315 B1 | 7/2002 | Glenn et al. |
| 6,424,710 B1 | 7/2002 | Bartolutti et al. |
| 6,428,361 B1 | 8/2002 | Imschweiler et al. |
| 6,431,906 B1 | 8/2002 | Belopolsky |
| 6,439,922 B1 | 8/2002 | Laurer et al. |
| 6,456,768 B1 | 9/2002 | Boncek et al. |
| 6,457,993 B1 | 10/2002 | Espenshade |
| 6,464,533 B1 | 10/2002 | Ma et al. |
| 6,478,610 B1 | 11/2002 | Zhou et al. |
| 6,478,611 B1 | 11/2002 | Hyland |
| 6,496,113 B2 | 12/2002 | Lee et al. |
| 6,496,382 B1 | 12/2002 | Ferguson et al. |
| 6,499,861 B1 | 12/2002 | German et al. |
| 6,522,308 B1 | 2/2003 | Mathieu |
| 6,541,756 B2 | 4/2003 | Schulz et al. |
| 6,543,940 B2 | 4/2003 | Chu |
| 6,556,761 B1 | 4/2003 | Jennings et al. |
| 6,577,243 B1 | 6/2003 | Dannenmann et al. |
| 6,580,086 B1 | 6/2003 | Schulz et al. |
| 6,618,022 B2 | 9/2003 | Harvey |
| 6,655,988 B1 | 12/2003 | Simmons et al. |
| 6,663,417 B1 | 12/2003 | Hung |
| 6,685,701 B2 | 2/2004 | Orszulak et al. |
| 6,688,908 B2 | 2/2004 | Wallace |
| 6,693,513 B2 | 2/2004 | Tuttle |
| 6,729,910 B2 | 5/2004 | Fuller |
| 6,733,186 B2 | 5/2004 | Pfleger |
| 6,750,643 B2 | 6/2004 | Hwang et al. |
| 6,773,298 B2 | 8/2004 | Gutierrez et al. |
| 6,784,802 B1 | 8/2004 | Stanescu ....................... 340/687 |
| 6,798,956 B2 | 9/2004 | Morrison |
| 6,808,116 B1 * | 10/2004 | Eslambolchi et al. ........ 235/492 |
| 6,829,427 B1 | 12/2004 | Becker |
| 6,831,443 B2 | 12/2004 | Liu |
| 6,847,856 B1 | 1/2005 | Bohannon ..................... 700/115 |
| 6,857,897 B2 | 2/2005 | Conn |
| 6,866,424 B2 | 3/2005 | Tanaka et al. |
| 6,881,096 B2 | 4/2005 | Brown et al. |
| 6,888,996 B2 | 5/2005 | Hwang et al. |
| 6,890,197 B2 | 5/2005 | Liebenow |
| 6,896,542 B2 | 5/2005 | Chang |
| 6,898,368 B2 | 5/2005 | Colombo et al. |
| 6,900,629 B2 | 5/2005 | Hwang et al. |
| 6,910,917 B2 | 6/2005 | Chen |
| 6,913,481 B2 | 7/2005 | Marshall et al. |
| 6,915,050 B2 | 7/2005 | Koyasu et al. |
| 6,921,284 B2 | 7/2005 | Sirichai et al. |
| 6,923,689 B2 | 8/2005 | Xue et al. |
| 6,924,997 B2 | 8/2005 | Chen et al. .................... 365/145 |
| 6,968,994 B1 | 11/2005 | Ashwood Smith |
| 6,971,895 B2 | 12/2005 | Sago et al. |
| 6,973,243 B2 | 12/2005 | Koyasu et al. ................ 385/100 |
| 6,975,242 B2 | 12/2005 | Dannenmann et al. |
| 6,979,223 B2 | 12/2005 | Chen |
| 6,989,741 B2 * | 1/2006 | Kenny et al. .................. 340/505 |
| 6,999,028 B2 | 2/2006 | Egbert |
| 7,014,100 B2 | 3/2006 | Zierolf |
| 7,014,500 B2 | 3/2006 | Belesimo |
| 7,018,242 B2 | 3/2006 | Brown |
| 7,038,135 B1 | 5/2006 | Chan et al. |
| 7,044,949 B2 | 5/2006 | Orszulak et al. |
| 7,061,380 B1 * | 6/2006 | Orlando et al. ............ 340/572.1 |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,102,520 B2 | 9/2006 | Liu et al. |
| 7,123,810 B2 | 10/2006 | Parrish |
| 7,132,641 B2 | 11/2006 | Schulz et al. |
| 7,140,782 B2 | 11/2006 | Frohlich et al. |
| 7,145,459 B2 | 12/2006 | Wu et al. |
| 7,151,455 B2 | 12/2006 | Lindsay et al. |
| 7,158,031 B2 | 1/2007 | Tuttle |
| 7,158,033 B2 | 1/2007 | Forster |
| 7,165,728 B2 | 1/2007 | Durrant et al. |
| 7,168,975 B2 | 1/2007 | Kuo |
| 7,170,393 B2 | 1/2007 | Martin |
| 7,170,413 B1 * | 1/2007 | Waterhouse et al. ...... 340/572.1 |
| 7,173,345 B2 | 2/2007 | Brandt et al. |
| 7,194,180 B2 | 3/2007 | Becker |
| 7,205,898 B2 | 4/2007 | Dixon et al. |
| 7,207,846 B2 | 4/2007 | Caveney et al. |
| 7,209,042 B2 * | 4/2007 | Martin et al. ............. 340/572.8 |
| 7,210,858 B2 | 5/2007 | Sago et al |
| 7,217,152 B1 | 5/2007 | Xin et al. |
| 7,221,276 B2 * | 5/2007 | Olsen et al. ................ 340/572.1 |
| 7,221,277 B2 | 5/2007 | Caron et al. |

| | | |
|---|---|---|
| 7,221,284 B2 | 5/2007 | Scherer et al. |
| 7,224,278 B2 | 5/2007 | Phaneuf et al. |
| 7,224,280 B2 | 5/2007 | Ferguson et al. |
| 7,233,250 B2 * | 6/2007 | Forster ........................ 340/572.8 |
| 7,243,837 B2 | 7/2007 | Durrant et al. |
| 7,247,046 B1 | 7/2007 | Wu |
| 7,252,538 B2 | 8/2007 | Garrett et al. |
| 7,253,735 B2 | 8/2007 | Gengel et al. |
| 7,265,674 B2 | 9/2007 | Tuttle |
| 7,268,688 B2 * | 9/2007 | Juds ............................ 340/572.8 |
| 7,275,970 B2 | 10/2007 | Hoshina |
| 7,285,007 B2 | 10/2007 | Barna |
| 7,294,786 B2 | 11/2007 | Aldereguia et al. |
| 7,297,018 B2 | 11/2007 | Caveney et al. |
| 7,297,028 B2 | 11/2007 | Daikuhara et al. |
| 7,298,266 B2 | 11/2007 | Forster |
| 7,298,330 B2 | 11/2007 | Forster |
| 7,298,946 B2 | 11/2007 | Mueller |
| 7,306,489 B2 | 12/2007 | Werthman et al. |
| 7,307,408 B2 | 12/2007 | Porcu et al. |
| 7,318,744 B2 | 1/2008 | Kuo |
| 7,327,278 B2 | 2/2008 | Dannenmann et al. |
| 7,336,883 B2 | 2/2008 | Scholtz |
| 7,349,605 B2 | 3/2008 | Noonan et al. |
| 7,352,285 B2 | 4/2008 | Sakama et al. |
| 7,352,289 B1 | 4/2008 | Harris |
| 7,354,298 B2 | 4/2008 | James |
| 7,356,208 B2 | 4/2008 | Becker |
| 7,471,209 B2 * | 12/2008 | Hart ............................ 340/686.1 |
| 7,504,953 B2 * | 3/2009 | Forster ........................ 340/572.8 |
| 7,511,601 B2 * | 3/2009 | Eisenberg et al. .......... 340/572.1 |
| 7,518,515 B2 * | 4/2009 | Trosper ....................... 340/572.1 |
| 2001/0027055 A1 | 10/2001 | Laity et al. |
| 2001/0039140 A1 | 11/2001 | Fasold et al. |
| 2002/0090858 A1 | 7/2002 | Caveney |
| 2002/0092347 A1 | 7/2002 | Niekerk et al. ............. 73/146.2 |
| 2003/0021580 A1 | 1/2003 | Matthews |
| 2003/0061393 A1 | 3/2003 | Steegmans et al. |
| 2003/0100217 A1 | 5/2003 | Wu |
| 2003/0100218 A1 | 5/2003 | Tsai et al. |
| 2003/0148654 A1 | 8/2003 | Kan |
| 2003/0162414 A1 | 8/2003 | Schulz et al. |
| 2003/0211782 A1 | 11/2003 | Esparaz et al. |
| 2004/0041714 A1 | 3/2004 | Forster ....................... 340/870.17 |
| 2004/0114879 A1 | 6/2004 | Hiereth et al. |
| 2004/0117515 A1 | 6/2004 | Sago et al. |
| 2004/0149736 A1 | 8/2004 | Clothier ...................... 219/627 |
| 2004/0253874 A1 | 12/2004 | Plishner |
| 2005/0032415 A1 | 2/2005 | Sakamoto |
| 2005/0052287 A1 | 3/2005 | Whitesmith et al. ..... 340/825.72 |
| 2005/0068179 A1 | 3/2005 | Roesner ...................... 340/572.1 |
| 2005/0076982 A1 | 4/2005 | Metcalf et al. ............. 152/152.1 |
| 2005/0093677 A1 | 5/2005 | Forster et al. |
| 2005/0122221 A1 | 6/2005 | Chuang et al. |
| 2005/0134461 A1 * | 6/2005 | Gelbman et al. ........... 340/572.8 |
| 2005/0173543 A1 * | 8/2005 | Ruping et al. .............. 235/492 |
| 2005/0215119 A1 | 9/2005 | Kaneko |
| 2005/0224585 A1 | 10/2005 | Durrant et al. .............. 235/492 |
| 2005/0232636 A1 | 10/2005 | Durrant et al. .............. 398/139 |
| 2005/0259930 A1 | 11/2005 | Elkins, II et al. ........... 385/100 |
| 2005/0260884 A1 | 11/2005 | Yueh |
| 2006/0007000 A1 * | 1/2006 | Yap ............................ 340/539.32 |
| 2006/0039136 A1 | 2/2006 | Probasco et al. |
| 2006/0040546 A1 * | 2/2006 | Werthman et al. .......... 439/488 |
| 2006/0044148 A1 | 3/2006 | Daniels et al. |
| 2006/0148279 A1 | 7/2006 | German et al. |
| 2006/0166546 A1 | 7/2006 | Ashizawa et al. |
| 2006/0232419 A1 | 10/2006 | Tomioka et al. |
| 2006/0233506 A1 | 10/2006 | Noonan et al. ............. 385/134 |
| 2006/0267778 A1 | 11/2006 | Gengel et al. |
| 2006/0275007 A1 | 12/2006 | Livingston et al. |
| 2006/0286856 A1 | 12/2006 | Sakamoto |
| 2007/0023525 A1 | 2/2007 | Son et al. |
| 2007/0035382 A1 * | 2/2007 | Lee et al. ..................... 340/10.1 |
| 2007/0059975 A1 | 3/2007 | Walsh |
| 2007/0117450 A1 | 5/2007 | Truxes |
| 2007/0120684 A1 | 5/2007 | Utaka et al. |
| 2007/0152828 A1 | 7/2007 | Mohalik |
| 2007/0155223 A1 | 7/2007 | Huang et al. |
| 2007/0196058 A1 | 8/2007 | Lee et al. |
| 2007/0205897 A1 | 9/2007 | Forster |
| 2007/0216534 A1 | 9/2007 | Ferguson et al. |
| 2007/0236355 A1 | 10/2007 | Flaster et al. |
| 2007/0247284 A1 | 10/2007 | Martin et al. |
| 2007/0273507 A1 * | 11/2007 | Burchell et al. ......... 340/539.27 |
| 2008/0003867 A1 | 1/2008 | Wu |
| 2008/0032546 A1 | 2/2008 | Xuan et al. |
| 2008/0090451 A1 | 4/2008 | Feldman |
| 2008/0100440 A1 * | 5/2008 | Downie et al. ............. 340/572.1 |
| 2008/0100456 A1 * | 5/2008 | Downie et al. ............. 340/572.8 |
| 2008/0100467 A1 * | 5/2008 | Downie et al. ............. 340/686.2 |
| 2008/0186178 A1 * | 8/2008 | Tuttle et al. ................. 340/572.1 |

FOREIGN PATENT DOCUMENTS

| | | |
|---|---|---|
| DE | 10249414 A1 | 5/2004 |
| EP | 1455550 A2 | 3/2004 |
| GB | 2371211 A | 4/2003 |
| JP | 03-242795 | 10/1991 |
| JP | 2002-264617 | 9/2002 |
| JP | 2003-148653 | 5/2003 |
| JP | 2003-172827 | 6/2003 |
| JP | 2003-229215 | 8/2003 |
| JP | 2004-039389 | 2/2004 |
| JP | 2004-142500 | 5/2004 |
| JP | 2004-152543 | 5/2004 |
| JP | 2004-245963 | 9/2004 |
| JP | 2004-247090 | 9/2004 |
| JP | 2004-264901 | 9/2004 |
| JP | 2004-265624 | 9/2004 |
| JP | 2004-317737 | 11/2004 |
| JP | 2004-349184 | 12/2004 |
| JP | 2005-018175 | 1/2005 |
| JP | 2005-033857 | 2/2005 |
| JP | 2005-050581 | 2/2005 |
| JP | 2005-084162 | 3/2005 |
| JP | 2005-086901 | 3/2005 |
| JP | 2005-087135 | 4/2005 |
| JP | 2005-092107 | 4/2005 |
| JP | 2005-134125 | 5/2005 |
| JP | 2005-216698 | 8/2005 |
| JP | 2005-302403 | 10/2005 |
| JP | 2005-315980 | 11/2005 |
| JP | 2005-339983 | 12/2005 |
| JP | 2006-054118 | 2/2006 |
| JP | 2006-245983 | 9/2006 |
| JP | 2006-279650 | 10/2006 |
| JP | 2007-087849 | 4/2007 |
| JP | 2007-088957 | 4/2007 |
| JP | 2007-158993 | 6/2007 |
| JP | 2007-189774 | 7/2007 |
| JP | 2007-221400 | 8/2007 |
| WO | 03/098175 A1 | 11/2003 |
| WO | 2004/030154 A2 | 4/2004 |
| WO | 2005/069203 A2 | 7/2005 |
| WO | 2008000656 A1 | 1/2008 |

* cited by examiner

PASSIVE RFID ELEMENTS HAVING VISUAL INDICATORS

TECHNICAL FIELD

The present invention relates generally to Radio Frequency Identification (RFID) elements. More particularly, the present invention concerns RFID elements having visual indicators powered via an external RF signal, and fiber optic connectors, receptacles, cables, and systems employing such RFID elements.

BACKGROUND OF THE INVENTION

Fiber optic cables are well known for connecting optical devices and systems. Some cables carry multiple fibers and have one or more connectors. "Pre-connectorized" cables have their connectors attached during manufacture, while others are terminated and have connectors attached upon installation. Cables known as patch cables, jumper cables, and fan-out cable assemblies are often relatively short and have one or more connectors at each end. In use, each connector will be placed within a port or socket located in a piece of equipment, patch panel, another connector, adaptor, etc.

As fiber optic equipment and networks become more common and more complex, the identification of proper cables, ports, and connectors for setting up and maintaining the systems accordingly becomes more complex. Therefore, indicia such as labels, hang tags, marking, coloration, and striping have been used to help identify specific fibers, cables, and/or connectors. While such indicia have been helpful in providing information to the technician setting up or servicing a system, further improvement could be achieved.

RFID systems can therefore be applied to fiber optic systems to provide information regarding fibers, components, connectors, and ports. For example, RFID elements (comprising an antenna and an RFID integrated circuit chip, functioning as a transponder) could be attached to connectors and ports for use in identification. The RFID chip stores information for RF transmission. Typically, these RFID elements are proposed to be passive, rather than powered, so they communicate the stored information responsive to interrogation by an RF signal received by the RFID element antenna. An RFID reader comprising a transceiver that sends an RF signal to the RFID elements and reads the responsive RF signals communicated by the RFID elements could then interrogate the RFID elements to determine stored information about the cable, component, connector, and/or port. In some fiber optic connector systems, an RFID transceiver antenna is located near the port for detecting an RFID element attached to the inserted connector, and the transceiver antenna further is connected to the remainder of the transceiver via wiring.

It is typically not feasible to employ powered (i.e., Semi passive or Active) RFID elements in complicated electro-optical systems because of the cost and complexity of incorporating such powered systems. Essentially, separate power sources and connections must be provided for the various RFID elements. Where a system is built using individual, modular, and/or reconfigurable components, use of powered RFID systems is not advantaged.

The various systems above generally rely upon a certain degree of proximity for operation. That is, the reader in the system would identify nearby RFID elements, or would identify pairs of elements close together (for example, on a connector and on a port holding the connector), all within the read range of the reader. The read range could be designed to be small, for example for rows of readers mounted on adjacent ports for reading only an inserted connector's RFID signal. Alternatively, the read range could be much larger, for example for handheld or room-size readers for reading multiple signals from one or more pieces of equipment.

However, such RFID systems have certain drawbacks. For example, depending for operation on the relative proximity to a targeted item can lead to either difficult or inaccurate results, as signals may be received and transmitted by unintended RFID elements on items nearby to the targeted item. Accordingly, the read range of a given RFID reader, whether incorporated into the port housing or separate, can be a limiting factor. Further, if a connector were only partially inserted into a port so as not to make a functional connection with the optical fiber(s), the RFID antennas in the connector and port or reader might inaccurately indicate the connection were made due to the proximity between the connector and port.

Moreover, when dealing with an entire panel of connectorized cables and ports, it may not be practical or even possible to rely upon proximity, either connector-to-port or reader-to-RFID element, as a method of querying a targeted RFID element. In fact, the RFID elements across the entire panel could respond to an RFID reader in certain situations, thereby providing no useful information as to identification of individual connectors or ports of interest.

Also, if identification of a certain RFID element is desired, upon query by a reader certain identifying indicia must be provided to the operator so as to find the RFID element. If such information is not pre-programmed into the RFID element chip or reader database at some point, it can be difficult or impossible to make such identification, even if the reader and RFID element are in full communication with each other.

In such situation, a technician may have to separate a connector from the port and panel to obtain information from the RFID element of the connector or port, thereby breaking the fiber optic connection in the process. Such action adds a step to the process of identification in terms of unplugging or at least re-orienting objects in a certain way to avoid "false" readings from the panel due to proximity issues. Also, it may be necessary to disconnect the optical fiber connectors, possibly one after another, until a targeted optical fiber is found. Such serial disconnection can be even more undesirable when equipment is operating and disconnections cause problems for the users of the systems. In such cases, the whole system may have to be shut down just to allow for the identification of a single cable, even if sophisticated RFID equipment is in place. The process becomes more complex when extended to entire networks including multiple equipment housings, cables, etc., perhaps spread throughout a building.

Therefore, further improvements in RFID technology and its application to fiber optic systems to allow for simple, reliable, and/or unobtrusive identification of one or more targeted items and/or mapping of networks would be welcome.

BRIEF SUMMARY OF THE INVENTION

According to certain aspects of the invention, a component is disclosed for terminating an optical fiber capable of carrying an optical signal, the component being connectable to the optical fiber, an RFID element attached to the component, the RFID element being a passive RFID element capable of receiving an external RF signal and generating an electrical signal in response, and a visual indicator attached to the RFID element, the visual indicator having a first indication state and a second indication state. The visual indicator is capable of changing between the first and second indication states depending upon electrical signals input into the visual indicator. The visual indicator is in electrical communication with and powerable by the RFID element, whereby when the RFID element receives the external RF signal the RFID element generates and communicates the electrical signal, thereby causing the visual indicator to change between the first and second indication states. Various options and modifications are possible.

For example, the visual indicator may be an LED, and the first indication state may be one in which the LED does not emit light and the second indication state may be one in which the LED emits light Also, a passive energy storage device may be in electrical communication with the RFID element and the visual indicator, the passive energy storage device being chargeable by the RFID element when the RFID element receives the external RF signal, the passive energy storage device being dischargeable to electrically power the visual indicator, thereby causing the visual indicator to change between the first and second indication states. If so, the passive energy storage device may include at least one of a capacitor and a trickle-fill battery.

Also, the electrical signal sent by the RFID element may cause the visual indicator to change between the first and second indication states according to a predetermined sequence in time. The external RF signal has a signal strength, and the duty cycle of the predetermined sequence may need to be adjusted according to the RF signal strength, in order to collect enough energy during the time the visual indicator is "OFF" to power the visual indicator when it is "ON". A capacitor may be in electrical communication with the RFID element, the capacitor being chargeable by the RFID element when the RFID element receives the external RF signal, the capacitor being dischargeable to electrically power the visual indicator, thereby causing the visual indicator to change between the first and second indication states according to the predetermined sequence.

If desired, the RFID element may include an antenna for receiving the external RF signal and an integrated circuit in electrical communication with the antenna and the visual indicator, the integrated circuit receiving input from the antenna and providing the electrical signal to the visual indicator in response. The RFID element may be a transponder capable of communicating an RF signal in response to receipt of the external RF signal.

A fiber optic cable may be provided including an optical fiber connector attached to such a component, and the fiber optic cable may be a pre-connectorized fiber optic cable.

According to other aspects of the invention, a receptacle is disclosed for connecting a terminated optical fiber capable of carrying an optical signal, the receptacle being connectable to the optical fiber, an RFID element, the RFID element being a passive RFID element capable of receiving an external RF signal and generating an electrical signal in response, and a visual indicator, the visual indicator having a first indication state and a second indication state. The visual indicator is capable of changing between the first and second indication states depending upon electrical signals input into the visual indicator. The visual indicator is in electrical communication with and powerable by the RFID element, whereby when the RFID element receives the external RF signal the RFID element generates and communicates the electrical signal, thereby causing the visual indicator to change between the first and second indication states. As above, various options and modifications are possible.

The receptacle may include at least one of a receiver, a wavelength multiplexer, a splitter, a cable assembly, an adaptor, and a socket of a network device. Further, the receptacle may define an opening configured for receiving a connector of a connectorized fiber optic cable.

According to certain other aspects of the invention, a communications system is disclosed providing identification of individual elements within the system based on transmission of RF signals, the system including a plurality of interconnected communications elements, a plurality of RFID elements, the RFID elements attached to one of the plurality of interconnected communications elements, the RFID elements being passive RFID elements. The RFID elements include an antenna for receiving an RF signal, an integrated circuit in electrical communication with the antenna for reading the RF signal to determine if the RF signal includes identification indicia related to the integrated circuit and to generate an electrical signal in response to detection of the identification indicia in the RF signal, and a visual indicator in electrical communication with the integrated circuit and powerable by the RF signal collected by the antenna, the visual indicator having a first indication state and a second indication state. The visual indicator is capable of changing between the first and second indication states upon receipt of the electrical signal from the integrated circuit. An RF transmitter transmits RF signals, the RF signals including identification indicia relating to at least one of the plurality of interconnected communications elements, whereby the RF transmitter sends an RF signal to the RFID elements and the respective integrated circuit determines whether the RF signal includes the identification indicia related to the respective integrated circuit. If so, the respective integrated circuit communicates an electrical signal to the visual indicator in communication with the respective integrated circuit, thereby causing the visual indicator to change between the first and second indication states. As above, various options and modifications are possible.

According to certain other aspects of the invention, a passive RFID element is disclosed with visual signaling capability, the passive RFID element including an antenna for receiving an external RF signal, an integrated circuit in electrical communication with the antenna, and a visual indicator in electrical communication with the integrated circuit and powerable by the RF signal collected by the antenna, the visual indicator having a first indication state and a second indication state. The visual indicator is capable of changing between the first and second indication states depending upon electrical signals input into the visual indicator, whereby when the antenna receives the external RF signal the integrated circuit generates and communicates the electrical signal, thereby causing the visual indicator to change between the first and second indication states. As above, various options and modifications are possible.

It is to be understood that both the foregoing general description and the following detailed description present examples of different aspects of the invention, and are intended to provide an overview or framework for understanding the nature and character of the aspects of the invention as it is claimed. The accompanying drawings are included to provide a further understanding of the different aspects of the invention, and are incorporated into and constitute a part of this specification.

DETAILED DESCRIPTION OF THE INVENTION

Figure 1:
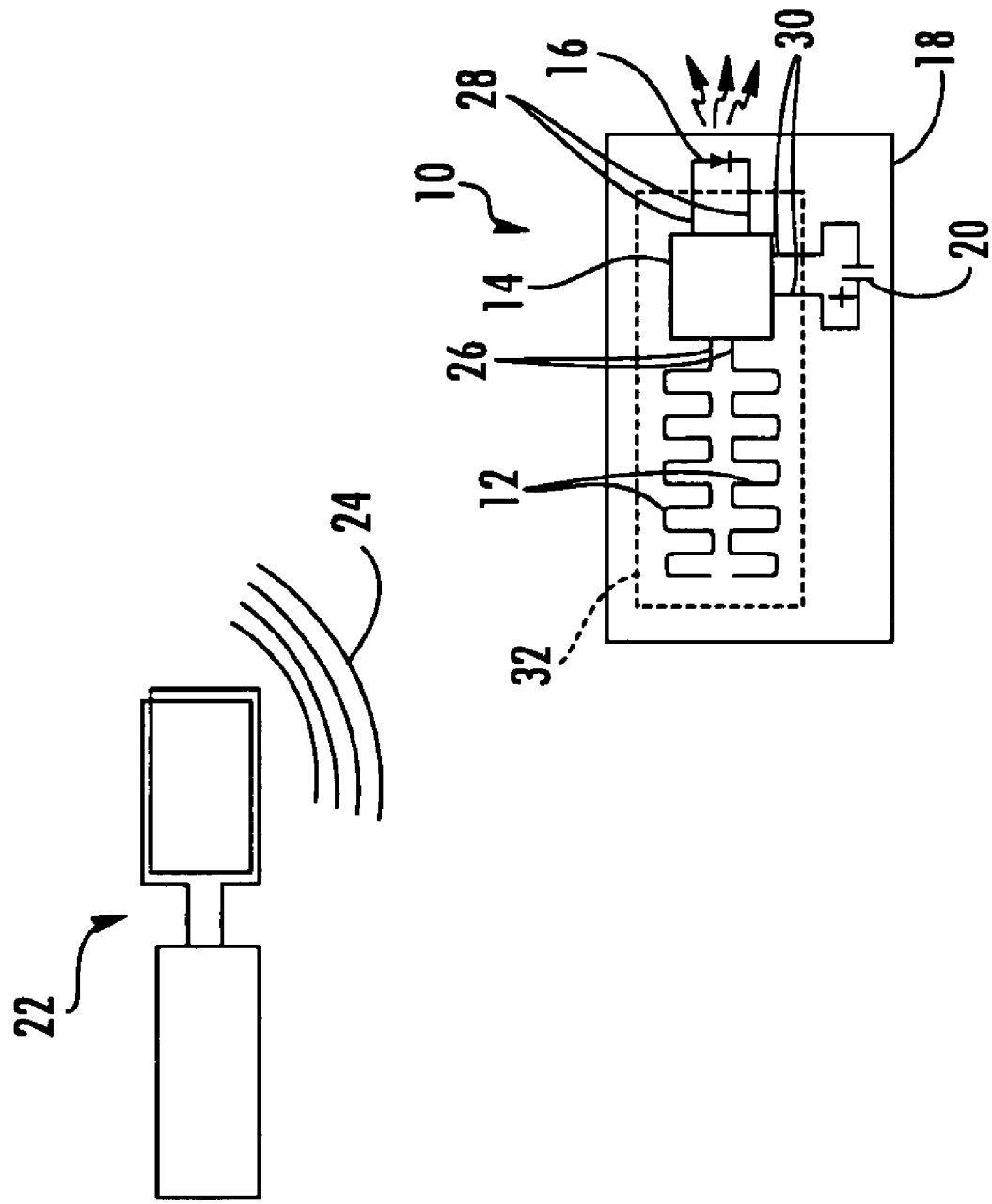
FIG. 1 is a representative schematic view of a passive RFID element having a visual indicator according to a first embodiment of the invention, along with a source of external RF signals.

Reference will now be made in detail to the present preferred embodiments of the invention, examples of which are illustrated in the accompanying drawings. Whenever possible, like or similar reference numerals will be used throughout the drawings to refer to like or similar parts. FIGS. 1-5 show examples of passive RFID elements, and of components, connectors, receptacles, cables, and systems in which RFID elements are employed. The exemplary embodiments employ passive RFID technology to allow for simple, reliable, and/or unobtrusive identification of one or more targeted items. It should be understood that the embodiments disclosed herein are merely examples, each incorporating certain aspects and benefits of the present invention. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the following examples.

FIG. 1 shows a first example of a passive RFID element 10 according to certain aspects of the invention. As illustrated, RFID element 10 includes an antenna 12, an integrated circuit 14, and a visual indicator 16. A base 18 may be provided to support elements 12-16. A passive energy storage device, in this case a capacitor 20, may also be included according to certain aspects of the invention. Source 22 of external RF signal 24, such as a reader, transceiver or the like, for use with RFID element 10, is also illustrated.

RFID element 10 may if desired operate in some ways as does a conventional RFID element, namely by receiving external RF signal 24 from a reader, transceiver, or the like via antenna 12. Integrated circuit 14, in electrical communication with antenna 12 via electrical connections 26, may process the received signal and respond in any of various ways. For example, integrated circuit 14 may send an electrical signal to antenna 12 causing a return RF signal to be communicated. Source 22 and/or any other RF reading devices within the range of the return RF signal can receive and process the return RF signal. Such functionality can be used for example to identify the presence, location, or status of RFID element 10 or a plurality of such elements, as desired in various applications. Information communicated by external signal 24 may be stored in the integrated circuit or other structure on RFID element 10, if desired, for example to assign an identification number to the RFID element.

RFID element 10 may be attached to any sort of device, device part, or location, limited only by the size and shape of the RFID element and the application. Generally, signal power received by an RFID element will vary inversely with the square of distance between the RF source 24 and the RFID element 10. The strength of signal available, RF signal fading, interference, and noise of the source 22 and RFID element 10, and the surrounding environment of use, etc. may also have an impact on the utilization of RFID element 10 and affect its performance and read range.

Visual indicator 16 of RFID element is connected to integrated circuit 14 via electrical connections 28. Visual indicator 16 is in electrical communication with integrated circuit 14 and is powered by the RF signal collected by antenna 12. Visual indicator 16 is changeable between first and second indication states upon receipt of electrical signals. For example, when external RF signals 24 are received by antenna 12 and transmitted to integrated circuit 14, the integrated circuit can send an electrical signal to visual indicator 16 causing the visual indicator to change indication state, i.e., to turn on or off.

As illustrated, visual indicator 16 comprises a light emitting diode (LED). LED's may be suitable for use with RFID element 10 in many applications for their low power requirements and small size. However, other types of visual indicators could be employed, such as incandescent or fluorescent elements, liquid crystal displays, etc. If an LED is used as visual indicator 16, the LED could be a single color or multicolor LED. Also, multiple LED's could be used, each having a different color or each oriented differently to improve viewability from different angles.

Signal strength from external RF signal 24 may be in some situations strong enough to power visual indicator 16 with enough power to effect a change from a first indication state to a second state bright enough to be readily perceived visually. Integrated circuit 14 may thus be programmed to turn on visual indicator 16 upon receipt of an external RF signal. Integrated circuit could also cause visual indicator to turn on intermittently or to flash according to a predetermined pattern, if desired. The type or rate of state change can have pre-selected meanings in addition to mere identification, such as status of RFID element 10 or an attached device, distance to the device, etc.

If desired, passive energy storage device 20 may be included to store energy received from external RF signal 24. RFID element 10 remains a passive RFID element even with the inclusion of passive energy storage device 20, as the RFID element and any passive energy storage device included is powered by the external RF signal. As illustrated, passive energy storage device 20 is a capacitor connected to integrated circuit 14 via electrical connections 30, although other circuit paths are possible. Passive energy storage device 20 stores electrical charge received via antenna 12 and integrated circuit 14. Discharge of passive energy storage device 20 can power visual indicator 16, either alone or in addition to energy contemporaneously received from antenna 12. Passive energy storage device may be useful in situations where the power obtained from external RF signal 24 is not strong enough to continuously change visual indicator 16 from one state to another, or to do so in a visually perceptible manner. For example, if an LED cannot be illuminated continuously or brightly enough to be readily seen due to RF signal power limitations, then a capacitor can be used to store energy from the external RF signal and to discharge at a certain duty cycle. In such fashion, the visual indicator may be more practically useful in certain applications in terms of visibility. Also, as mentioned above, different duty cycles or flashing patterns could be employed to provide additional information.

An estimated power level in the range of a fraction of a milliwatt to up to several milliwatts or more may be required to maintain an LED in a continuously illuminated state, depending on the LED selected. Accordingly, the area of antenna 12 of RFID element 10 can be designed with the expected distance from and power of source 22 in mind so as to allow for the desired continuous or duty cycle illumination. Also, for a given RFID element configuration, the strength of the external RF signal may be selected to achieve the desired illumination. A lower power external RF signal could still provide sufficient power for illumination according to duty cycle, such as 5:1 or 10:1 (ratio of total time to illumination time). Similar modifications can be made for other forms of visual indicator 16, so as to achieve change of indication state based on receipt of external RF signal 24.

Passive energy storage device 20 should be selected so as to be able to provide enough power when discharged to cause visual indicator 16 to change from the first to second indication state. If visual indicator 16 is an LED, storage device 20 of some embodiments may comprise a capacitor having a capacitance in the range of about 10 uF to about 100 uF, or in further embodiments, a capacitance of more than 100 uF. Also, the capacitance can be selected depending on the desired duty cycle. If a duty-cycling is desired, such can be effected by way of direct instruction from the integrated circuit to the passive energy storage device 20 to charge and discharge. Alternatively, the passive energy storage device may be wired into a simple electronic circuit made of discrete components allowing the capacitor to alternately charge and discharge. Integrated circuit 14 would simply activate the electronic circuit, which would then cycle until the integrated circuit deactivated the electronic circuit.

Figure 2:
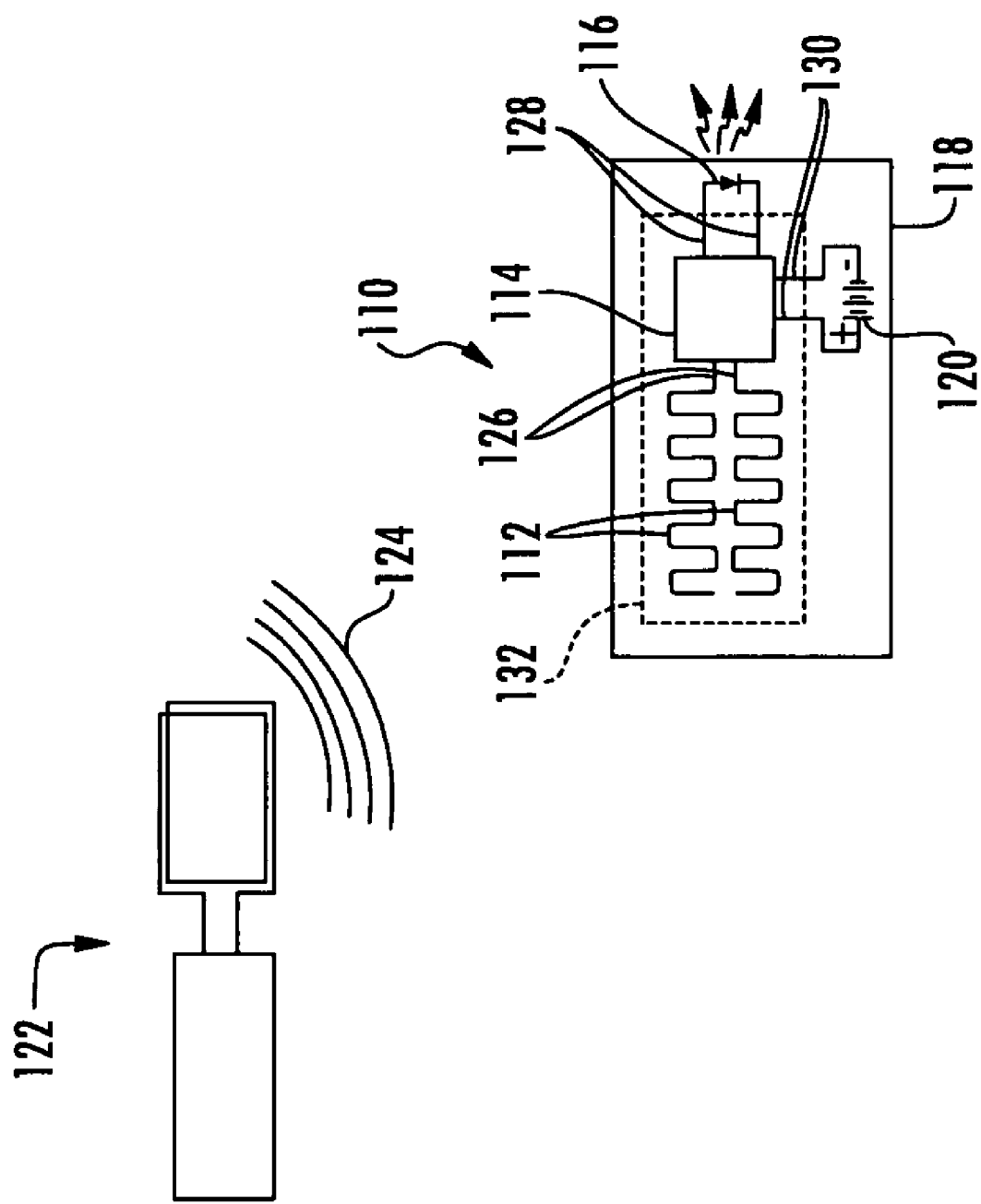
FIG. 2 is a representative schematic view of a passive RFID element having a visual indicator according to a second embodiment of the invention, along with a source of external RF signals.

FIG. 2 shows a second embodiment of a passive RFID element 110 according to certain other aspects of the invention. In element 110, all parts illustrated are as found above in element 10, except that passive storage device 120 is a trickle-fill battery rather than a capacitor. Operation of passive RFID element 110 is similar to that described above. The trickle-fill battery is charged by energy derived from the external RF signals 124 by the antenna 112 and integrated circuit 114. The visual indication device 116 operates as above, either continuously or according to a duty cycle. A suitable trickle fill battery would be a long-life miniature rechargeable battery, having a capacity in the range of about 1 mAh to about 10 mAh, or in further embodiments, a capacity of more than 10 mAh. Further embodiments of the present invention include alternative storage devices.

Figure 3:
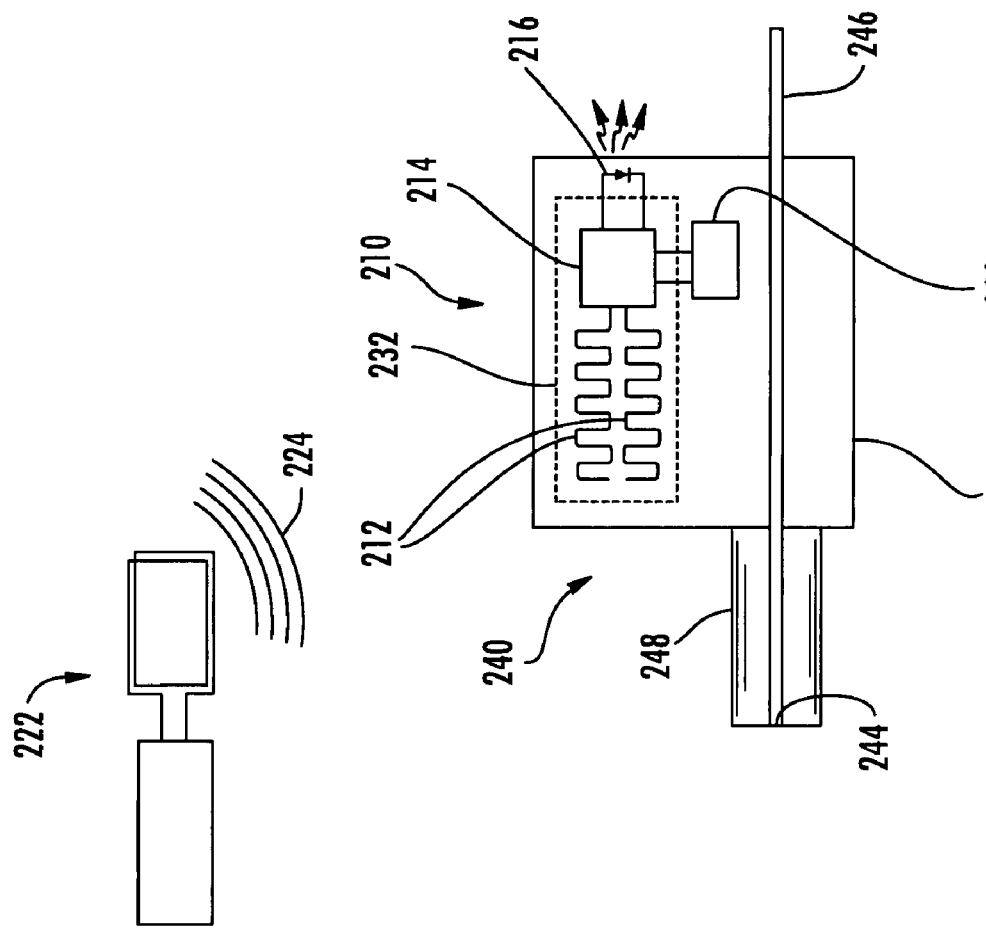
FIG. 3 is a representative schematic view of a fiber optic component according to certain aspects of the invention and including a passive RFID element having a visual indicator, along with a source of external RF signals.

FIG. 3 shows a representative illustration of an embodiment of a passive RFID element 210 attached to a fiber optic component 240. As shown, component 240 is connected to an end 244 of an optical fiber 246. Component 240 also may include a ferrule 248 for aligning the fiber end to another fiber. Component 240 may comprise, for example, any suitable type of transmitter, receiver, wavelength multiplexer, splitter, splice, or connector design, whether for a single or multiple fiber cable, and no limitation on type or configuration of component should be implied. Integrated circuit 214 may include stored information such as serial number, type of connector, cable type, manufacturer, manufacturing date, installation date, location, lot number, performance parameters (such as attenuation measured during installation), identification of what is at other end of the cable, etc. Such information could be preloaded on integrated circuit 214 at manufacture or upon installation via source 222. Any of this information or other information may serve as identifying indicia that may be assigned or polled by an RF source and/or reader.

Passive energy storage device 220 is illustrated generically in FIG. 3; it could be a capacitor, a trickle-fill battery, or any other suitable device charged via the external RF signal 224. Visual indicator 216 is illustrated again as an LED, but it should be understood that any suitable visual indicator could be used. Visual indicator 216 could be mounted in various ways, such as to the outside of component 240, within the component, beneath a transparent or translucent cover, beneath a scattering cover to improve viewing angles, etc. Multiple RFID elements can be used with a given component or other network device. For example, if a component has multiple fibers, one RFID element could be used per fiber, or one could be used on each side of the component to help identify the proper order or polarity for connection of a multifiber component. Alternatively, each passive RFID element could indicate a state of a given fiber (connected, active, etc.).

The application of passive RFID technology with visual indicators to fiber optic systems is particularly useful. By including RFID elements 210 on components 240, individual components can be readily identified wirelessly during connectorization, installation, or troubleshooting. For example, a source 222 of external RF signals can send a signal including identifying indicia related to one of the RFID elements in a given area. Upon receipt of the external RF signal 224, the particular RFID element can cause its visual indicator to change indication state. Therefore, a craftsperson can readily identify a particular cable plugged in to a panel by this method, without having to unplug or manipulate any cables. If an LED is used, the craftsperson simply causes an external RF signal to be sent including an instruction for the LED on the desired item to change state (illuminate, turn off, or flash). The external RF signal 224 and/or the integrated circuit 214 may include additional status information and/or programming that can be used to cause the visual indication device to change state in different ways depending on line status (in use, not in use, connected, disconnected, etc.). In certain embodiments of the present invention, opposite ends of patch cables could have alternate visual indications of state, or they could both have the same indications at the same time when the external RF signal is sent. In further embodiments of the present invention, the visual indications of state could be provided at any position along the patch cables. Thus, various functionalities are possible with such a passive RFID element 210 and a component 240. By using passive RFID technology, various indication uses are provided without complicated, expensive, and/or impractical issues implementation of powered RFID systems.

Figure 4:
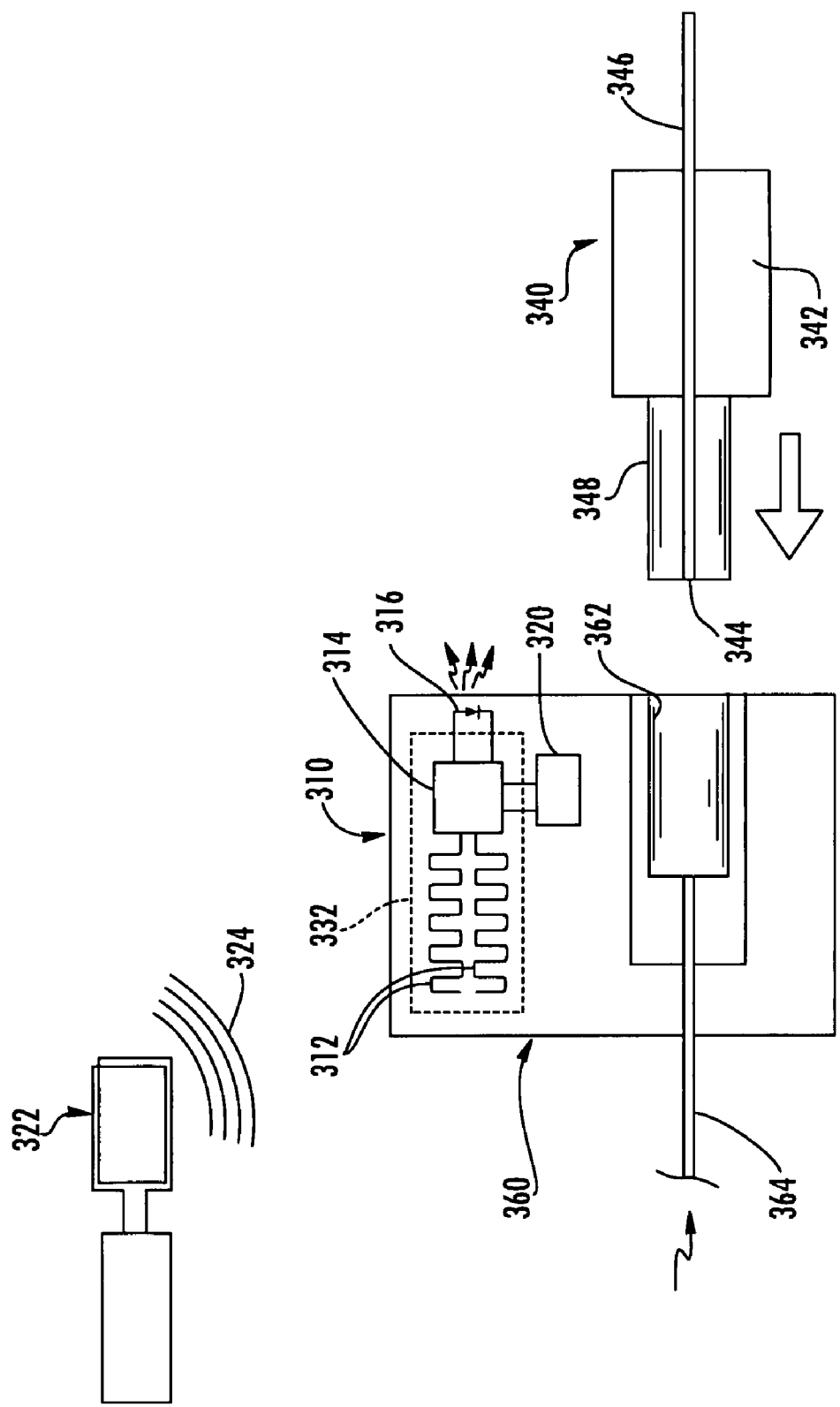
FIG. 4 is a representative schematic view of a receptacle for a fiber optic component according to certain aspects of the invention and including a passive RFID element having a visual indicator, along with a source of external RF signals.

FIG. 4 shows an embodiment in which a passive RFID element 310 is attached to a receptacle 360 for receiving a terminated optical fiber component. As shown, receptacle may comprise structures such as an adapter for receiving a component 340, a receiver, a wavelength multiplexer, a splice, a splitter, a cable assembly, or a socket of a network device, etc. As shown, visual indicator 316 operates to change indication state upon receipt of an external RF signal by passive RFID element 310. At least one opening 362 may be provided for receiving a component 340. If multiple openings 362 are provided, multiple passive RFID elements may be used associated with an opening in some way. Fiber 364 is connected to fiber 346 when component 340 is plugged into receptacle 360. Additional inputs to integrated circuit 314 are possible to provide information about connection of the physical elements or signal flow through the connected fibers 346 and 364. If so, such information can be used to determine whether and/or how visual indicator 316 changes from a first to a second indication state upon receipt of an external RF signal 324. Further embodiments of the present invention include the RFID functionality and/or connector configurations disclosed in U.S. patent application Ser. Nos. 11/590,377; 11/590,505; and 11/590,513 all of which were filed on Oct. 31, 2006 and are assigned to the present assignee, the disclosures of which are incorporated herein in their entirety.

Figure 5:
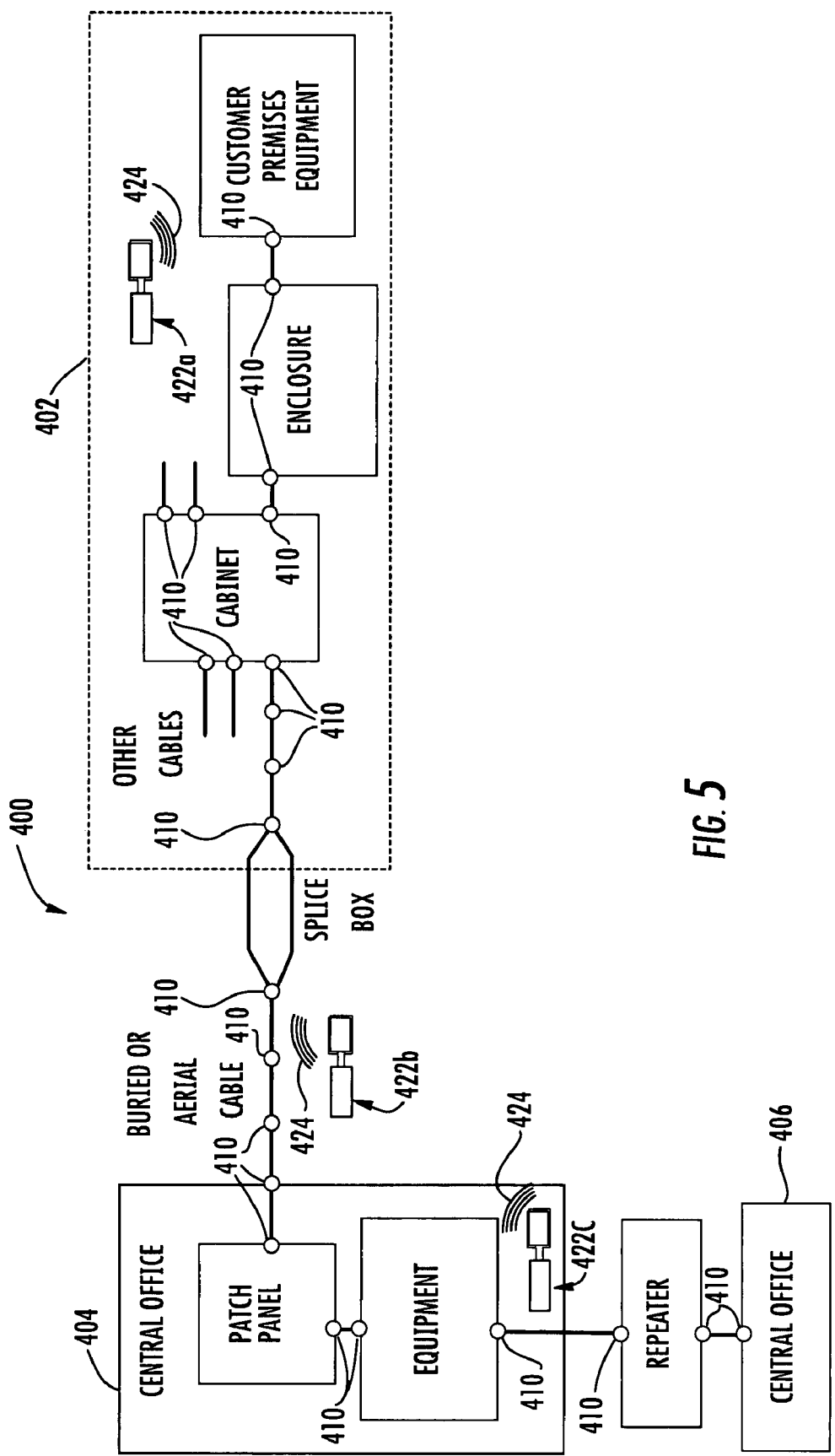
FIG. 5 is a representative schematic view of a system according to certain aspects of the invention and including a plurality of passive RFID elements having visual indicators, along with a plurality of sources of external RF signals.

FIG. 5 shows a representative system 400 in which multiple passive RFID elements 410 are utilized. System 400 includes customer premises 402, a LEC central office 404, a remote central office 406, and a plurality of external RF signal sources 422a, 422b, 422c, which may comprise readers for sending and receiving signals 424. Sources 422a and 422c are fixed in location, and source 422b is mobile, for example hand-held. Some or all of the passive RFID elements 410 may include a visual indicator, as described above, for changing visual states in response to receipt of external RF signals.

If the RF signals 424 include identifying indicia relating to at least one of the RFID elements, the passive RFID elements 410 within range of the signals will receive and process the signal. The integrated circuits of the RFID elements will then determine whether the identifying indicia received are associated with that circuit and, if so, cause a change in state in the visual indicator. Therefore, an external RF signal could be sent including identifying indicia related to illuminating an LED on passive RFID element associated with a given component, connector, adapter, housing, cable, etc. The LED could illuminate continuously, or on a duty cycle according to various factors, as discussed above. The external RF signal could also cause groups of RFID elements to be activated, for example, a subset of connectors plugged into a patch panel, or the connectors at a desired end of a group of patch cables. Use of such a visual indicator powered by the external RF signals used in the RFID system thus provides information useful to the technician in any number of situations. Such identifying indicia may be preprogrammed into the integrated circuit chip within the RFID element and/or it may be assigned or modified at installation and stored in the integrated circuit chip. The technician may thus identify all connectors manufactured on a certain date, or a certain type, installed on a certain date, that are fully connected, that are carrying signal, etc. Other inputs to the integrated circuit are also possible, such as temperature sensors, humidity sensors, etc., which can also serve as identifying indicia. The purposes and applications for use of a visual indicator operated by external RF signals are limitless.

Thus, it will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed:

1. A device comprising:
a visual indicator having a first indication state and a second indication state, the visual indicator capable of changing between the first and second indication states depending upon an electrical signal input into the visual indicator, the visual indicator being in electrical communication with and powerable by a RFID element; and
an RFID element being a passive RFID element capable of receiving an external RF signal and in response, generating and communicating an electrical signal to the visual indicator based on programmed status information stored in the RFID element to cause the visual indicator to change between the first and second indication states.

2. The device of claim 1, wherein the visual indicator is an LED, and the first indication state is one in which the LED does not emit light and the second indication state is one in which the LED does emit light.

3. The device of claim 1, further including a passive energy storage device in electrical communication with the RFID element and the visual indicator, the passive energy storage device being chargeable by the RFID element when the RFID element receives the external RF signal, the passive energy storage device being dischargeable to electrically power the visual indicator, thereby causing the visual indicator to change between the first and second indication states.

4. The device of claim 1, wherein the programmed status information causes the visual indicator to change between the first and second indication states according to a predetermined temporal pattern.

5. The device of claim 1, wherein the RFID element includes an antenna configured to receive the external RF signal, and an integrated circuit in electrical communication with the antenna and the visual indicator, the integrated circuit configured to receive input from the antenna and generating the electrical signal in response.

6. The device of claim 1, wherein the RFID element is a transponder capable of communicating an RF signal in response to receipt of the external RF signal.

7. A fiber optic cable including an optical fiber attached to the device of claim 1.

8. The fiber optic cable of claim 7, wherein the fiber optic cable is a pre-connectorized fiber optic cable.

9. The device of claim 1, wherein the device is disposed in a connector including a housing being connectable to an end of an optical fiber.

10. The device of claim 1, wherein the first indication state and the second indication state of the visual indicator comprises at least one of the group comprising states of different color and states of different flashing patterns.

11. The device of claim 1 disposed in a receptacle for connecting an optical fiber component capable of carrying an optical signal.

12. The device of claim 11 provided in the form of at least one of an adaptor, a receiver, a wavelength multiplexer, a splitter, a cable assembly, and a socket of a network device.

13. The device of claim 11, further comprising an opening configured for receiving a component or a connector of a connectorized fiber optic cable.

14. The device of claim 1, further comprising:
a plurality of RFID elements, each attached to one of a plurality of interconnected communications elements, the plurality of RFID elements being passive RFID elements and including:
an antenna for receiving the external RF signal; and
an integrated circuit in electrical communication with the antenna for reading the external RF signal to determine if the external RF signal includes identification indicia related to the integrated circuit and to generate an electrical signal in response to detection of the identification indicia in the external RF signal; and
an RF transmitter for transmitting RF signals, the RF signals including identification indicia relating to at least one of the plurality of interconnected communications elements, whereby the RF transmitter is configured to send an RF signal to the plurality of RFID elements and the RFID element is configured to determine whether the external RF signal includes the identification indicia related to the respective integrated circuit and, if so, the respective integrated circuit communicates an electrical signal to the visual indicator in communication with the respective integrated circuit, thereby causing the visual indicator to change between the first and second indication states.

15. The device of claim 1, further comprising:
an antenna for receiving the external RF signal;
an integrated circuit in electrical communication with the antenna; and
wherein the visual indicator is in electrical communication with the integrated circuit and powerable by the RF power collected by the antenna, whereby the integrated circuit is configured to generate and communicate the electrical signal, thereby causing the visual indicator to change between the first and second indication states in response to receipt of the external RF signal.

16. The device of claim 1, wherein the RFID element is configured to determine, based on the programmed status information stored in the RFID element, if the electrical signal should be generated and communicated to the visual indicator to cause the visual indicator to change between the first and second indication states.

17. The device of claim 1, wherein the RFID element is configured to generate and communicate the electrical signal based on the programmed status information stored in the RFID element corresponding to the external RF signal.

18. The device of claim 1, wherein programmed status information includes information for the second indication state.

19. The device of claim 1, wherein the programmed status information is comprised of status information of a component connected to the device.

20. A method of actuating a visual indicator associated with an RFID element, comprising:
receiving an external RF signal at a passive RFID element; and
in response to receipt of the external RF signal, the passive RFID element generating and communicating an electrical signal to a visual indicator based on programmed status information stored in the passive RFID element, to cause the visual indicator, being in electrical communication with and powerable by the passive RFID element, to change between a first indication state and a second indication state.

21. The method of claim 20, further comprising the programmed status information causing the visual indicator to change between the first and second indication states according to a predetermined temporal pattern.

22. The method of claim 21, further comprising adjusting the predetermined temporal pattern to enable sufficient power to be captured to power the visual indicator with the signal strength of the external RF signal.

23. The method of claim 21, further comprising:
charging a capacitor in electrical communication with the RFID element when the RFID element receives the external RF signal; and
discharging the capacitor to electrically power the visual indicator, thereby causing the visual indicator to change between the first and second indication states according to the predetermined temporal pattern.

24. The method of claim 20, wherein the first indication state and the second indication state of the visual indicator comprises at least one of the group comprising states of different color and states of different flashing patterns.

25. The method of claim 20, further comprising determining based on the programmed status information stored in the RFID element, if the electrical signal should be generated and communicated to the visual indicator to cause the visual indicator to change between the first and second indication states.

26. The method of claim 20, comprising the passive RFID element generating and communicating the electrical signal to the visual indicator based on the programmed status information stored in the RFID element corresponding to the external RF signal.

27. A device, comprising:
a visual indicator having a first indication state and a second indication state, the visual indicator capable of changing between the first and second indication states depending upon an electrical signal input into the visual indicator, the visual indicator being in electrical communication with and powerable by a RFID element; and
an RFID element being a passive RFID element capable of receiving an external RF signal and in response, generating and communicating an electrical signal to the visual indicator to cause the visual indicator to change between the first and second indication states;
wherein the electrical signal sent by the RFID element is configured to cause the visual indicator to change between the first and second indication states according to a predetermined temporal pattern; and
wherein the predetermined temporal pattern is adjustable to enable sufficient power to be captured to power the visual indicator with the signal strength of the external RF signal.

28. The device of claim 27, further including a passive energy storage device in electrical communication with the RFID element, the passive energy storage device being chargeable by the RFID element when the RFID element receives the external RF signal, the passive energy storage device being dischargeable to electrically power the visual indicator, thereby causing the visual indicator to change between the first and second indication states according to the predetermined temporal pattern.

29. The device of claim 27, wherein the RFID element includes an antenna configured to receive the external RF signal and an integrated circuit in electrical communication with the antenna and the visual indicator, the integrated circuit configured to receive input from the antenna and providing the electrical signal to the visual indicator in response.

30. The device of claim 27, wherein the first indication state and the second indication state of the visual indicator comprises at least one of the group comprising states of different color and states of different flashing patterns.

31. A method for actuating a visual indicator associated with a passive RFID element, comprising:
receiving an external RF signal at the passive RFID element;
in response to receipt of the external RF signal, the passive RFID element generating and communicating an electrical signal to the visual indicator, thereby causing a visual indicator, being in electrical communication with and powerable by the passive RFID element, to change between a first indication state and a second indication state according to a predetermined temporal pattern; and
adjusting the predetermined temporal pattern to enable sufficient power to be captured to power the visual indicator with the signal strength of the external RF signal.

32. The method of claim 31, further comprising:
charging a passive energy storage device in electrical communication with the passive RFID element when the passive RFID element receives the external RF signal; and discharging the passive energy storage device to electrically power the visual indicator, thereby causing the visual indicator to change between the first and second indication states according to the predetermined temporal pattern.

33. The method of claim 31, wherein the first indication state and the second indication state of the visual indicator comprises at least one of the group comprising states of different color and states of different flashing patterns.

34. The device of claim 1, wherein the programmed status information is comprised of connection information.

35. The device of claim 1, wherein the programmed status information is comprised of connection information of a component connected to the device.

36. The device of claim 1, wherein the programmed status information is comprised of disconnect information.

37. The device of claim 1, wherein the device is attached or provided as part of a component, wherein the programmed status information is comprised of status information regarding the component.

38. The device of claim 1, wherein the programmed status information is comprised of line status.

39. The device of claim 38, wherein the line status is comprised of in use status.

40. The device of claim 38, wherein the line status is comprised of not in use status.

41. The device of claim 1, wherein the programmed status information is comprised of a physical attribute of a component.

42. The device of claim 41, wherein the component is comprised of a component to which the device is attached or provided.

43. The device of claim 41, wherein the component is comprised of a component connected to the device.

44. The device of claim 27, wherein the visual indicator is an LED, and the first indication state is one in which the LED does not emit light and the second indication state is one in which the LED does emit light.

45. A fiber optic cable including an optical fiber attached to the device of claim 27.

46. The device of claim 27 disposed in a receptacle for connecting an optical fiber component capable of carrying an optical signal.

47. The device of claim 28, wherein the passive energy storage device includes at least one of a capacitor and a trickle-fill battery.

48. The method of claim 31, wherein the passive energy storage device includes at least one of a capacitor and a trickle-fill battery.

49. The method of claim 31, wherein the visual indicator is an LED, and the first indication state is one in which the LED does not emit light and the second indication state is one in which the LED does emit light.

50. A device comprising:
a visual indicator having a first indication state and a second indication state, the visual indicator capable of changing between the first and second indication states depending upon an electrical signal input into the visual indicator, the visual indicator being in electrical communication with and powerable by an RFID element; and
an RFID element being a passive RFID element capable of receiving an external RF signal and in response, generating and communicating an electrical signal to the visual indicator based on a programmed type of connector stored in the RFID element to cause the visual indicator to change between the first and second indication states.

51. The device of claim 50, wherein the visual indicator is an LED, and the first indication state is one in which the LED does not emit light and the second indication state is one in which the LED does emit light.

52. The device of claim 50, further including a passive energy storage device in electrical communication with the RFID element and the visual indicator, the passive energy storage device being chargeable by the RFID element when the RFID element receives the external RF signal, and the passive energy storage device being dischargeable to electrically power the visual indicator, thereby causing the visual indicator to change between the first and second indication states.

53. The device of claim 50, wherein the programmed type of connector causes the visual indicator to change between the first and second indication states according to a predetermined temporal pattern.

54. A device comprising:
a visual indicator having a first indication state and a second indication state, the visual indicator capable of changing between the first and second indication states depending upon an electrical signal input into the visual indicator, the visual indicator being in electrical communication with and powerable by an RFID element; and
an RFID element being a passive RFID element capable of receiving an external RF signal and in response, generating and communicating an electrical signal to the visual indicator based on a programmed cable type stored in the RFID element to cause the visual indicator to change between the first and second indication states.

55. The device of claim 54, wherein the visual indicator is an LED, and the first indication state is one in which the LED does not emit light and the second indication state is one in which the LED does emit light.

56. The device of claim 54, further including a passive energy storage device in electrical communication with the RFID element and the visual indicator, the passive energy storage device being chargeable by the RFID element when the RFID element receives the external RF signal, and the passive energy storage device being dischargeable to electrically power the visual indicator, thereby causing the visual indicator to change between the first and second indication states.

57. The device of claim 54, wherein the programmed cable type causes the visual indicator to change between the first and second indication states according to a predetermined temporal pattern.

58. A device comprising:
a visual indicator having a first indication state and a second indication state, the visual indicator capable of changing between the first and second indication states depending upon an electrical signal input into the visual indicator, the visual indicator being in electrical communication with and powerable by an RFID element; and
an RFID element being a passive RFID element capable of receiving an external RF signal and in response, generating and communicating an electrical signal to the visual indicator based on programmed manufacturer information stored in the RFID element to cause the visual indicator to change between the first and second indication states.

59. The device of claim 58, wherein the visual indicator is an LED, and the first indication state is one in which the LED does not emit light and the second indication state is one in which the LED does emit light.

60. The device of claim 58, further including a passive energy storage device in electrical communication with the RFID element and the visual indicator, the passive energy storage device being chargeable by the RFID element when the RFID element receives the external RF signal, and the passive energy storage device being dischargeable to electrically power the visual indicator, thereby causing the visual indicator to change between the first and second indication states.

61. The device of claim 58, wherein the programmed manufacturer information is comprised of a component type.

62. The device of claim 58, wherein the device is attached or provided as part of a first component, and wherein the programmed manufacturer information is comprised of a serial number of a second component connected to the first component.

63. The device of claim 58, wherein the programmed manufacturer information causes the visual indicator to change between the first and second indication states according to a predetermined temporal pattern.

64. A device comprising:
a visual indicator having a first indication state and a second indication state, the visual indicator capable of changing between the first and second indication states depending upon an electrical signal input into the visual indicator, the visual indicator being in electrical communication with and powerable by an RFID element; and
an RFID element being a passive RFID element capable of receiving an external RF signal and in response, generating and communicating an electrical signal to the visual indicator based on a programmed manufacture date stored in the RFID element to cause the visual indicator to change between the first and second indication states.

65. The device of claim 64, wherein the visual indicator is an LED, and the first indication state is one in which the LED does not emit light and the second indication state is one in which the LED does emit light.

66. The device of claim 64, further including a passive energy storage device in electrical communication with the RFID element and the visual indicator, the passive energy storage device being chargeable by the RFID element when the RFID element receives the external RF signal, and the passive energy storage device being dischargeable to electrically power the visual indicator, thereby causing the visual indicator to change between the first and second indication states.

67. The device of claim 64, wherein the programmed manufacture date causes the visual indicator to change between the first and second indication states according to a predetermined temporal pattern.

68. A device comprising:
a visual indicator having a first indication state and a second indication state, the visual indicator capable of changing between the first and second indication states depending upon an electrical signal input into the visual indicator, the visual indicator being in electrical communication with and powerable by an RFID element; and
an RFID element being a passive RFID element capable of receiving an external RF signal and in response, generating and communicating an electrical signal to the visual indicator based on a programmed installation date stored in the RFID element to cause the visual indicator to change between the first and second indication states.

69. The device of claim 68, wherein the visual indicator is an LED, and the first indication state is one in which the LED does not emit light and the second indication state is one in which the LED does emit light.

70. The device of claim 68, further including a passive energy storage device in electrical communication with the RFID element and the visual indicator, the passive energy storage device being chargeable by the RFID element when the RFID element receives the external RF signal, and the passive energy storage device being dischargeable to electrically power the visual indicator, thereby causing the visual indicator to change between the first and second indication states.

71. The device of claim 68, wherein the programmed installation date causes the visual indicator to change between the first and second indication states according to a predetermined temporal pattern.

72. A device comprising:
a visual indicator having a first indication state and a second indication state, the visual indicator capable of changing between the first and second indication states depending upon an electrical signal input into the visual indicator, the visual indicator being in electrical communication with and powerable by an RFID element; and
an RFID element being a passive RFID element capable of receiving an external RF signal and in response, generating and communicating an electrical signal to the visual indicator based on programmed location information stored in the RFID element to cause the visual indicator to change between the first and second indication states.

73. The device of claim 72, wherein the visual indicator is an LED, and the first indication state is one in which the LED does not emit light and the second indication state is one in which the LED does emit light.

74. The device of claim 72, further including a passive energy storage device in electrical communication with the RFID element and the visual indicator, the passive energy storage device being chargeable by the RFID element when the RFID element receives the external RF signal, and the passive energy storage device being dischargeable to electrically power the visual indicator, thereby causing the visual indicator to change between the first and second indication states.

75. The device of claim 72, wherein the programmed location information causes the visual indicator to change between the first and second indication states according to a predetermined temporal pattern.

76. A device comprising:
a visual indicator having a first indication state and a second indication state, the visual indicator capable of changing between the first and second indication states depending upon an electrical signal input into the visual indicator, the visual indicator being in electrical communication with and powerable by an RFID element; and
an RFID element being a passive RFID element capable of receiving an external RF signal and in response, generating and communicating an electrical signal to the visual indicator based on a programmed lot number stored in the RFID element to cause the visual indicator to change between the first and second indication states.

77. The device of claim 76, wherein the visual indicator is an LED, and the first indication state is one in which the LED does not emit light and the second indication state is one in which the LED does emit light.

78. The device of claim 76, further including a passive energy storage device in electrical communication with the RFID element and the visual indicator, the passive energy storage device being chargeable by the RFID element when the RFID element receives the external RF signal, and the passive energy storage device being dischargeable to electrically power the visual indicator, thereby causing the visual indicator to change between the first and second indication states.

79. The device of claim 76, wherein the programmed lot number causes the visual indicator to change between the first and second indication states according to a predetermined temporal pattern.

80. A device comprising:
a visual indicator having a first indication state and a second indication state, the visual indicator capable of changing between the first and second indication states depending upon an electrical signal input into the visual indicator, the visual indicator being in electrical communication with and powerable by an RFID element; and
an RFID element being a passive RFID element capable of receiving an external RF signal and in response, generating and communicating an electrical signal to the visual indicator based on a programmed performance parameter stored in the RFID element to cause the visual indicator to change between the first and second indication states.

81. The device of claim 80, wherein the visual indicator is an LED, and the first indication state is one in which the LED does not emit light and the second indication state is one in which the LED does emit light.

82. The device of claim 80, further including a passive energy storage device in electrical communication with the RFID element and the visual indicator, the passive energy storage device being chargeable by the RFID element when the RFID element receives the external RF signal, and the passive energy storage device being dischargeable to electrically power the visual indicator, thereby causing the visual indicator to change between the first and second indication states.

83. The device of claim 80, wherein the programmed performance parameter causes the visual indicator to change between the first and second indication states according to a predetermined temporal pattern.

84. The device of claim 80, wherein the programmed performance parameter is comprised of a measured attenuation.

85. A device comprising:
a visual indicator having a first indication state and a second indication state, the visual indicator capable of changing between the first and second indication states depending upon an electrical signal input into the visual indicator, the visual indicator being in electrical communication with and powerable by an RFID element; and
an RFID element being a passive RFID element capable of receiving an external RF signal and in response, generating and communicating an electrical signal to the visual indicator based on a programmed distance stored in the RFID element to cause the visual indicator to change between the first and second indication states.

86. The device of claim 85, wherein the visual indicator is an LED, and the first indication state is one in which the LED does not emit light and the second indication state is one in which the LED does emit light.

87. The device of claim 85, further including a passive energy storage device in electrical communication with the RFID element and the visual indicator, the passive energy storage device being chargeable by the RFID element when the RFID element receives the external RF signal, and the passive energy storage device being dischargeable to electrically power the visual indicator, thereby causing the visual indicator to change between the first and second indication states.

88. The device of claim 85, wherein the programmed distance causes the visual indicator to change between the first and second indication states according to a predetermined temporal pattern.

89. The device of claim 85, wherein the programmed distance is comprised of distance to the RFID element.

90. The device of claim 85, wherein the programmed distance is comprised of distance between the RFID element and an RFID reader.

* * * * *